(12) United States Patent
Cleveland

(10) Patent No.: US 7,044,278 B2
(45) Date of Patent: May 16, 2006

(54) CORD REEL ADAPTING DEVICE AND METHOD

(76) Inventor: Timothy Wayne Cleveland, W2546 Blackberry Dr., Mount Calvary, WI (US) 53057

( * ) Notice: Subject to any disclaimer, the term of this patent is extended or adjusted under 35 U.S.C. 154(b) by 63 days.

(21) Appl. No.: 10/900,667

(22) Filed: Jul. 28, 2004

(65) Prior Publication Data

US 2005/0039996 A1 Feb. 24, 2005

Related U.S. Application Data

(60) Provisional application No. 60/492,184, filed on Aug. 1, 2003.

(51) Int. Cl.
*H02G 11/00* (2006.01)
(52) U.S. Cl. .................. 191/12.4; 191/12.2 R
(58) Field of Classification Search ........... 191/12.2 R, 191/12.4; 242/375, 375.1, 403; 137/355.16, 137/355.23, 355.26, 355.27
See application file for complete search history.

(56) References Cited

U.S. PATENT DOCUMENTS

| 989,534 | A | | 4/1911 | MacDuffee |
| 2,274,330 | A | | 2/1942 | Hammond |
| 2,301,104 | A | | 11/1942 | Yost |
| 2,450,257 | A | * | 9/1948 | Simmons ................ 191/12.2 R |
| 2,480,401 | A | | 8/1949 | Edwards |
| 3,033,488 | A | * | 5/1962 | Weber ..................... 242/375.1 |
| 3,040,139 | A | * | 6/1962 | Appleton ................ 191/12.2 R |
| 3,167,161 | A | * | 1/1965 | Appleton ................ 191/12.2 R |
| 3,197,578 | A | * | 7/1965 | Becker et al. ............. 191/12.4 |
| 3,400,230 | A | * | 9/1968 | Becker et al. ......... 191/12.2 R |
| 3,694,588 | A | * | 9/1972 | Appleton ................ 191/12.2 A |
| 3,876,045 | A | | 4/1975 | Knarreborg |
| 4,284,180 | A | | 8/1981 | Masters |
| 4,473,197 | A | * | 9/1984 | Yach ........................ 242/375.1 |
| 4,721,833 | A | | 1/1988 | Dubay |
| 5,915,641 | A | | 6/1999 | Barberg |
| 6,056,226 | A | | 5/2000 | Green |

* cited by examiner

*Primary Examiner*—Mark T. Le
(74) *Attorney, Agent, or Firm*—Gehrke & Associates, S.C.

(57) ABSTRACT

An adaptor for converting a hose reel to a cord reel includes a waterproof electrical box having a rotating contact therein, a linking electrical cord, wherein the linking cord enters the box and terminates in the rotating contact; and an outlet electrical cord. The outlet electrical cord is connected to the adaptor and terminates in the electrical box with a stationary contact assembly. A set of wires in the outlet electrical cord are connected to the stationary contact assembly with a machine screw. A set of electrical contacts are connected to the stationary contact assembly, and the contacts engage the rotating contact to supply power to the linking cord while allowing rotation of the linking cord around the spool of the hose reel.

17 Claims, 5 Drawing Sheets

US 7,044,278 B2

CORD REEL ADAPTING DEVICE AND METHOD

CROSS-REFERENCE TO RELATED APPLICATION

The present application is a continuation of and claims priority to U.S. Provisional Patent Application No. 60/492,184, filed Aug. 1, 2003.

BACKGROUND OF THE INVENTION

1. Field of the Invention

The device and method of the present invention relates to a cord reel, and more particularly, relates to a hose reel adapted to use as a cord reel.

2. Discussion of the Related Art

As the use of electrical devices becomes more and more prevalent in and about the home, the use of extension cords to supply power to those devices likewise increases. While many hand-held electrical devices have begun employ cordless features, these require re-charging and suffer from a variety of problems such as requiring additional bulk and weight and developing an inability to hold a charge. In addition, larger electrical devices that require a great deal of electrical power to run are not well suited to cordless operation. These larger devices can be gasoline powered, but many users find gas powered devices messy and inconvenient to refill, store, and care for. Thus, although alternatives exist, the use of electrical extension cords is still preferred by many and the use of such cords has not diminished.

However, a drawback to using an electrical extension cord about the home, yard, garage, or shop is the unmanageability of the unraveled cord. Unless restrained in some fashion, the cord tends to become tangled and dirty, may present a tripping hazard to those walking in the vicinity of the cord, and is difficult to re-coil for storage. An unrestrained cord, especially of a longer length or heavy-duty gauge, can also be difficult to transport from its storage location to the location in which it will be used.

A variety of electrical cord managers are available, including winding reels and take-up reels in various configurations. Most of these products are expensive, perhaps making them appropriate for a professional worker who deals with power tools on a daily basis, but not appropriate for a homeowner who uses power tools on a more attenuated basis. In addition, many of the dedicated power cord managers on the market are not sturdy enough for use by either a professional or a homeowner, both of whom require durability in a product designed to manage an electrical extension cord.

A device to manage electrical cords that is both durable and inexpensive is therefore needed.

SUMMARY OF THE INVENTION

The present invention comprises a hose reel that is adapted to serve as a cord reel. The invention also contemplates a method for creating an adaptor and adapting a hose reel to serve as a cord reel.

One aspect of the present invention includes an adaptor for converting a hose reel to a cord reel. The adaptor includes a waterproof electrical box having a rotating contact therein, a linking electrical cord, wherein the linking cord enters the box and terminates in the rotating contact; and an outlet electrical cord. The outlet electrical cord is connected to the adaptor and terminates in the electrical box with a stationary contact assembly. A set of wires in the outlet electrical cord are connected to the stationary contact assembly with a machine screw. A set of electrical contacts are connected to the stationary contact assembly, and the contacts engage the rotating contact to supply power to the linking cord while allowing rotation of the linking cord around the spool of the hose reel.

Another aspect of the present invention includes a conversion system for converting a hose reel for use as a cord reel. The system includes a hose reel having a frame including a pair of opposing side panels wherein the frame holds a rotating spool therebetween, a hose attachment module including a threaded portion wherein the hose attachment module is attached to one of the side panels of the hose reel, an adaptor attached to the one of the side panels of the hose reel, wherein the adaptor includes an outlet electrical cord and a linking electrical cord, a threaded connection portion attached at a first end to the adaptor and attached at a second end opposite the first end to the hose attachment module, wherein the threaded connection portion matingly engages the threaded portion of the hose attachment module. The linking electrical cord extends from the threaded connection portion through the hose attachment module and is trained through an opening in the rotating spool.

Yet another aspect of the present invention includes an apparatus for converting a hose reel having a frame with a pair of opposing side panels holding a rotating spool therebetween for use as a cord reel including a hose attachment module attached to one of the side panels of the hose reel, an adaptor attached to the one of the side panels of the hose reel, wherein the adaptor includes an outlet electrical cord and a linking electrical cord, and a connection portion attached at a first end to the adaptor and attached at a second end opposite the first end to the hose attachment module, wherein the connection portion forms a waterproof connection with the hose attachment module. The linking electrical cord extends from the connection portion through the hose attachment module and is trained through an opening in the rotating spool.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Figure 1:
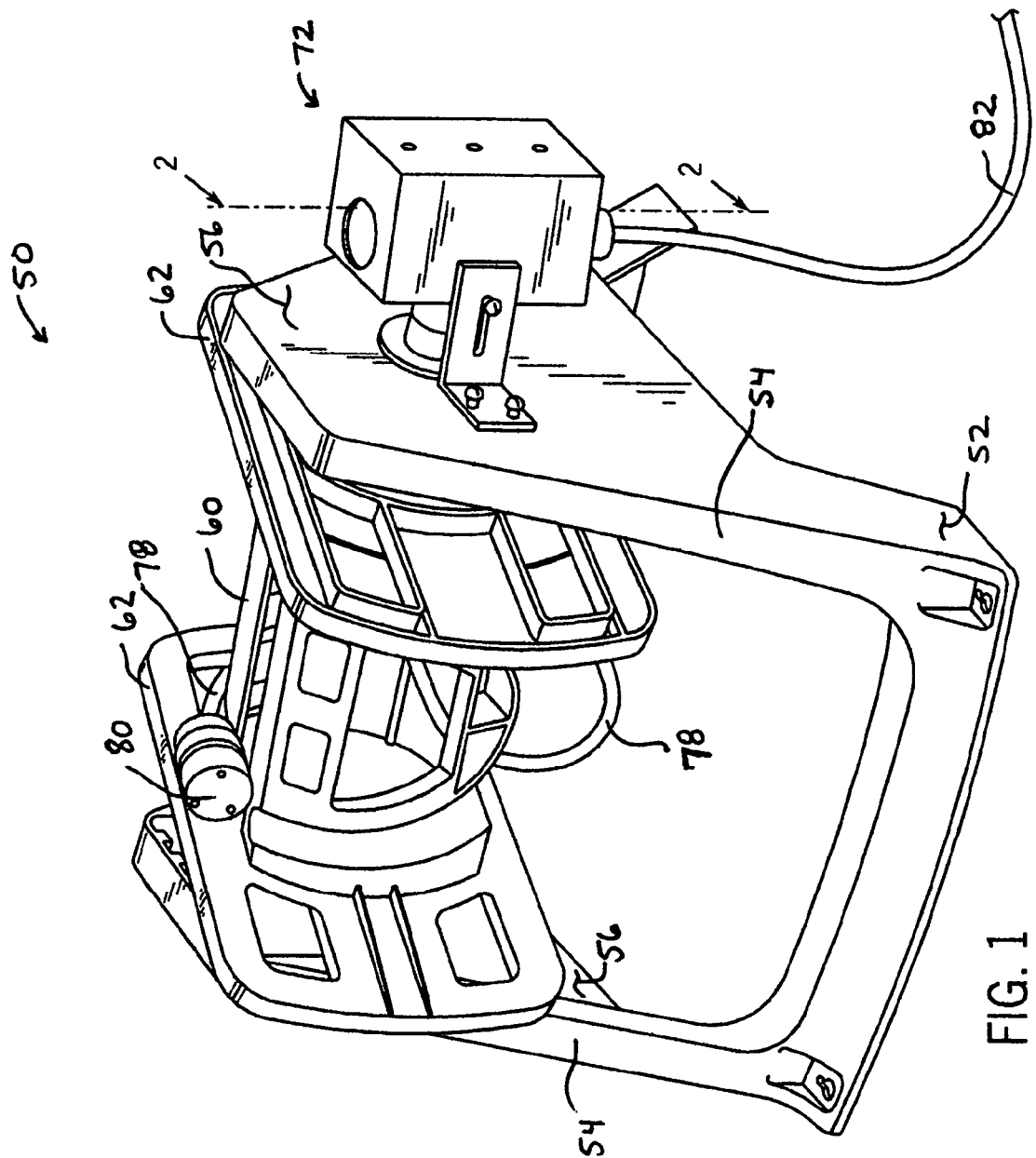
FIG. 1 is a perspective view of a standard hose reel adapted for use as a cord reel.

The present invention comprises a standard hose reel 50, as seen in FIG. 1, having a frame 52 that may include a pair of legs 54 and a pair of side panels 56. The frame 52 of the hose reel 50 holds a spool 60 having end portions 62 that can be manually rotated with a crank handle 64 (not shown) attached to the exterior of frame 52.

In conventional hose reels, a relatively short hose portion (not shown) is connected from an exterior portion of a hose attachment module to a water source (not shown). The interior portion of the hose attachment module is then connected with an end of the relatively long main hose (not shown) that is inserted through an opening in the spool 60.

The interior portion can also be attached to an interim hose portion (not shown) that extends to the surface or exterior of the spool 60 for easier connection of the main hose. In either configuration, the main hose can then be wound about the spool 60 by cranking the handle, can be unwound by pulling the unconnected end of the hose, and can be carried from place to place by disconnecting the short hose portion from the water source and employing a carrying handle.

Figure 2:
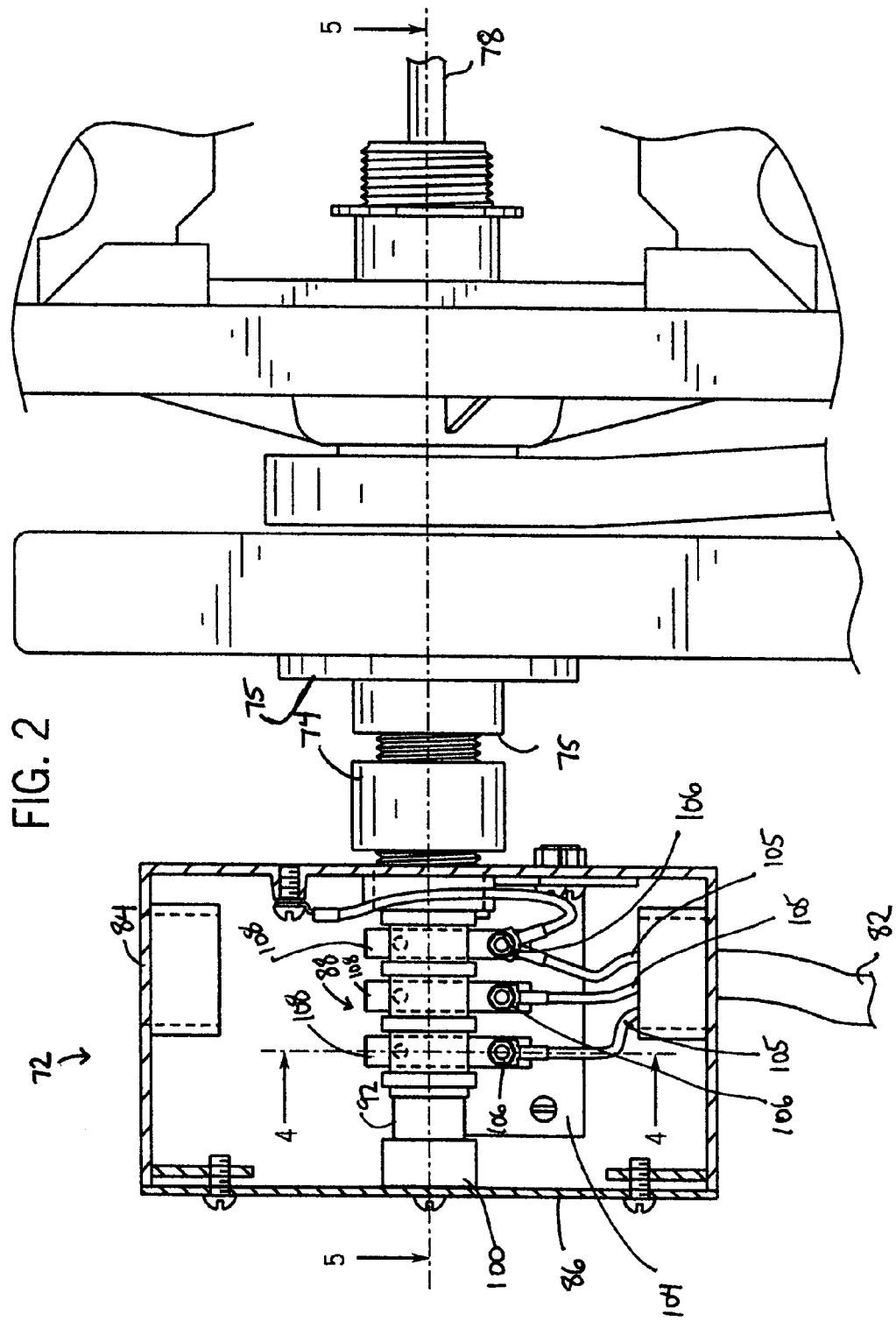
FIG. 2 is a cross-sectional view of the cord reel along line 2—2 of FIG. 1.
Figure 3:
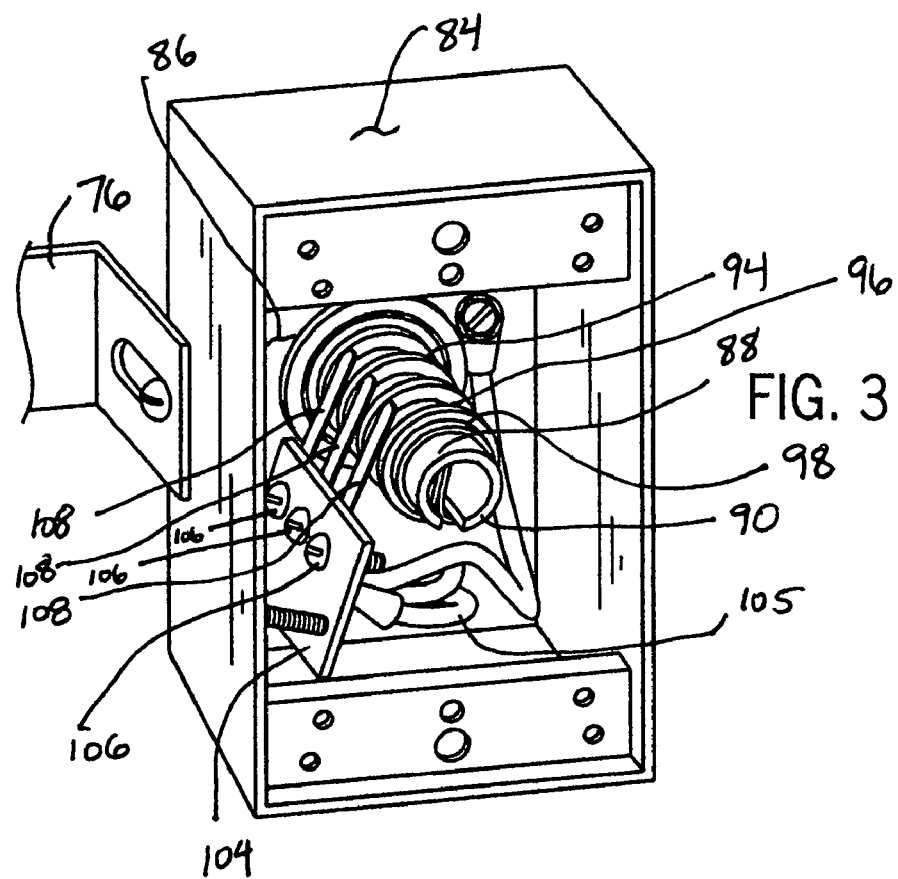
FIG. 3 is a perspective view of an adaptor to be attached to a hose reel.
Figure 4:
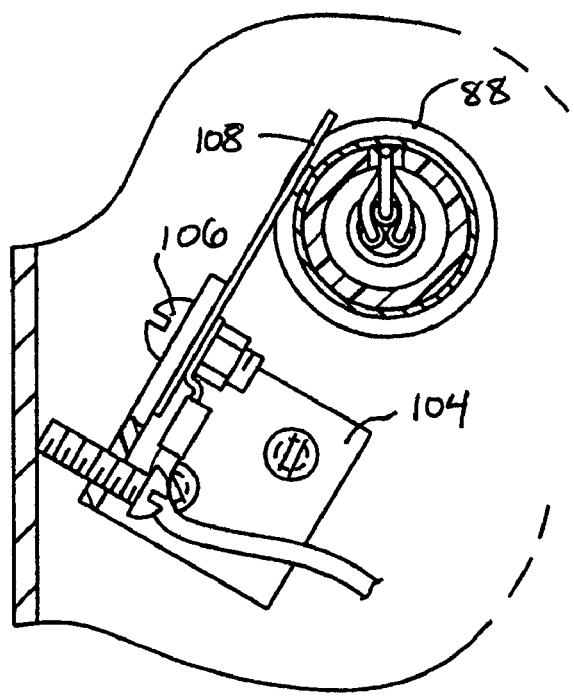
FIG. 4 is a cross-sectional view of an adaptor to be attached to a hose reel.
Figure 5:
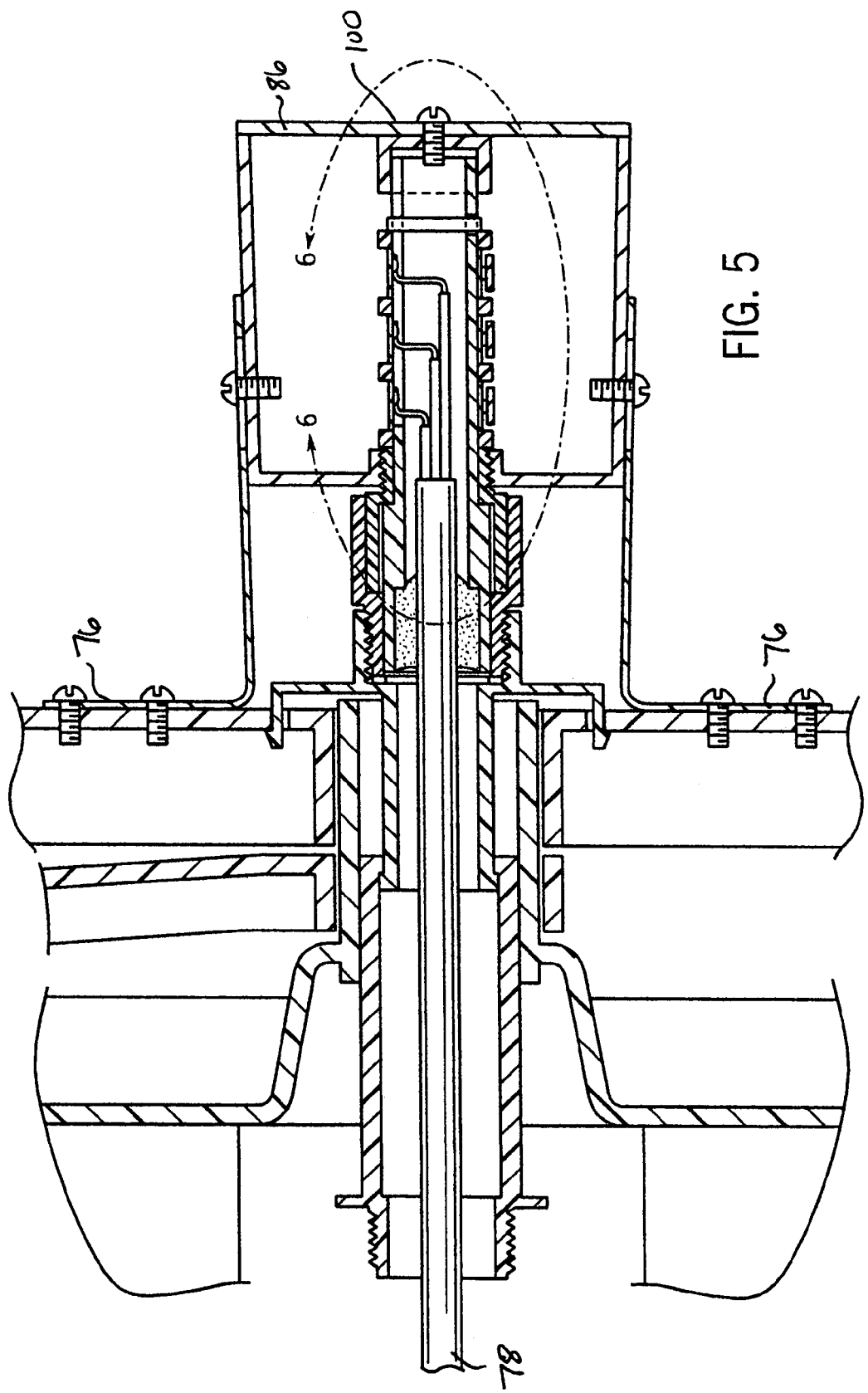
FIG. 5 is a cross-sectional view of an adaptor attached to the hose reel.
Figure 6:
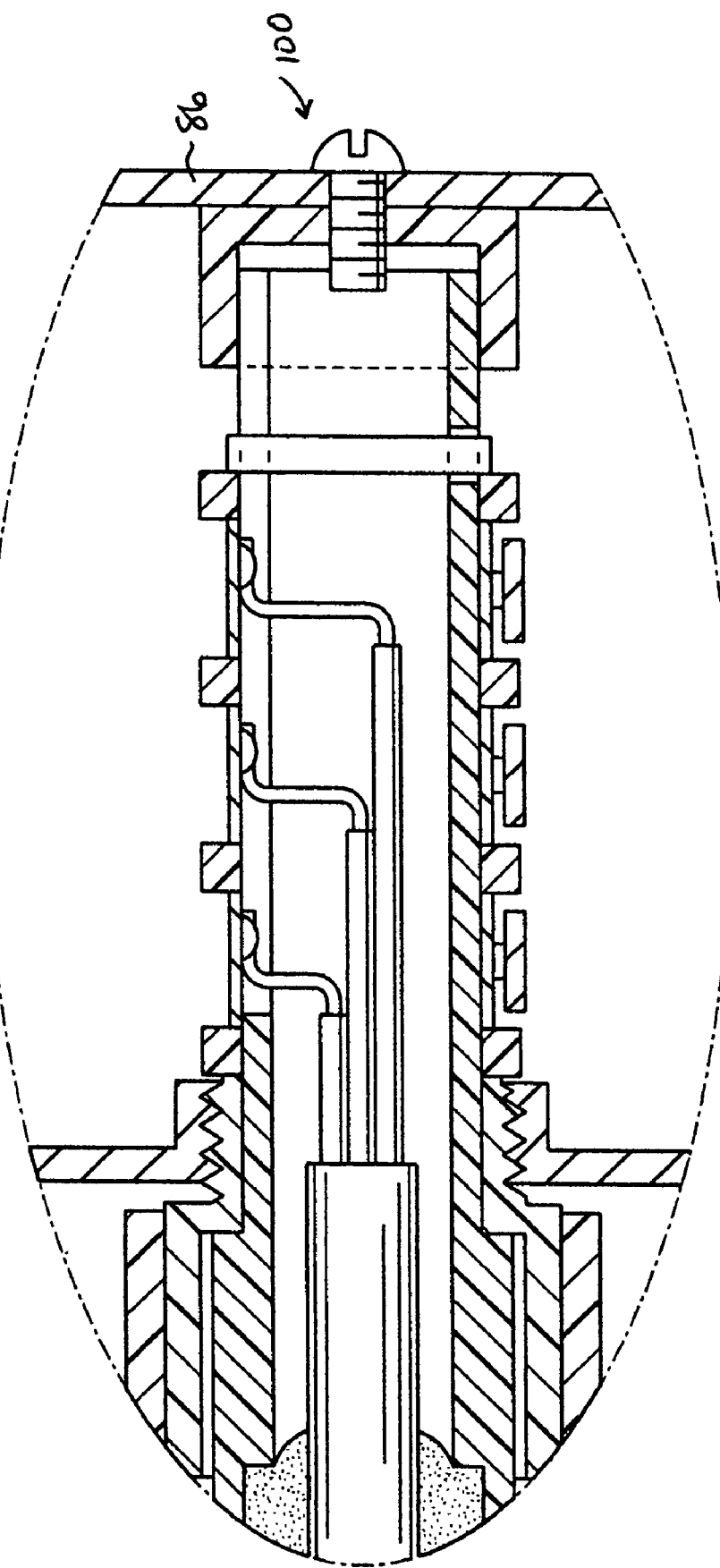
FIG. 6 is an enlarged view of the cross-section of the adaptor attached to the hose reel.

The present invention utilizes an adaptor 72 to convert the hose reel 50 to use as a cord reel. As illustrated in FIGS. 2–4, adaptor 72 has an adaptive connection portion 74 that connects with a hose attachment module 75. Connection portion 74 is shown as a threaded piece capable of being screwed into a threaded portion of hose attachment module 75 to form a waterproof connection. However, connection portion 74 need not be threaded but could be made to be push-inserted and could be provided with a seal for waterproof connection. Likewise, many other suitable manners of attaching the adaptor 72 to the module 75 could be devised and, though a waterproof connection is preferred, it is not required.

In the present embodiment, adaptor 72 is additionally attached to side panel 56 (on which hose attachment module 75 is located) by way of brackets 76 (FIG. 3). Brackets 76 are screwed or otherwise connected to panel 56 to more sturdily secure adapter 72 to side panel 56, since the size and weight of adaptor 72 requires more support than the connection portion 74 alone can provide, especially since adaptor 72 is not flush with the surface of side panel 56 when connected. However, it should be noted that other embodiments of the invention are envisioned in which the adaptor 72 is lighter and/or more compact and/or situated closer to panel 56 such that adapter 72 need not be secured with brackets 76. Rather, it is contemplated that in other embodiments, a smaller, lighter adaptor 72 could be supplied so that extra support would not be required, or that the support needed could be supplied in a less obtrusive manner. Support structures could include a strap, a pair of smaller brackets, a single bracket, a set of snaps or Velcro attachments, or any variety of suitable attachment means.

Adaptor 72 of the present embodiment further comprises a linking cord 78 that extends from the connection 74 through hose attachment module 75. Depending on the configuration of hose reel 50, linking cord 78 is trained through an opening in spool 60 so that it hangs over spool 60, as seen in FIG. 1. Turning now to FIG. 1, in the present embodiment, linking cord 78 is provided with a separate plug portion 80 that is attached to the free end of cord 78 after cord 78 is trained through module 75 and spool 60. Adaptor 72 further includes an outlet connecting cord 82. Cord 82 extends from adaptor 72 and can be plugged into a standard three-prong electric outlet for connecting the main extension cord to a power source (FIG. 1).

Adaptor 72 is further made up of a variety of interior electrical components. Turning now to FIGS. 2–6, the main portion of adaptor 72 is a single gang weatherproof electrical box 84 with a blank cover 86. Linking cord 78 enters box 84 through connection portion 74 and terminates in a rotating contact 88. Rotating contact 88 is constructed of a ½-inch CPVC pipe 90, a coupling 92, a ½-inch PVC electrical male adaptor 94, a ¾-inch PVC electrical male adaptor 96, and a ¾ to ½-inch rigid conduit electrical reducer bushing 98. Blank cover 86 holds rotating contact 88 in place via a ½-inch CPVC pipe cap 100 attached to its interior.

Cord 82 terminates within box 84 with stationary contact assembly 104, and wires 105 from cord 82 are connected to assembly 104 by machine screws 106. Electrical contacts 108 are also connected to assembly 104 by machine screws 106 and contacts 108 supply power from cord 82 to rotating contact 88 so that linking cord 78 is likewise powered and an extension cord (not shown) can be powered. The arrangement of the stationary contacts 108 and the rotating contacts 88 allows power to be fed to the linking cord 78 while still allowing for rotation of the cord 78 by way of a crank. Thus, the extension cord (not shown)—and the household tool or device being powered thereby—can be used even while the cord is being wound or unwound from the spool 60. As the user moves farther from the reel 50, this will be advantageous since the user will be able to continue performing his or her chores. And, when the user moves closer to reel 50, he or she can take up excess cord, thus preventing injury and tangling, while continuing to use the electric tool or device.

The embodiment shown in the accompanying figures and described in detail herein is only one of many possible embodiments of the present invention. The invention is not limited to the use of the standard electrical connections described, but could be comprised of any number of variations of connections producing the same results. In addition, as discussed above, it is envisioned that a more lightweight adapter, perhaps with a slimmer profile, could be developed in accordance with the invention. Such an embodiment could be injection-molded or otherwise constructed of plastic or any other suitable material or combination of materials.

An embodiment that reduced the profile of the adaptor, making it more lightweight and simple to install is envisioned so that adapting a hose reel to an electrical reel could be accomplished in only two or three steps. Such an adapter could be sold in conjunction with a hose reel or could be purchased separately to modify an existing hose reel to use as an extension cord reel. Consumers simply desiring an inexpensive cord reel could purchase both the inventive adapter and the reel, either for home assembly or already assembled for use as a cord reel, while consumers seeking to convert an already purchased hose reel to a better or different use as a cord reel could purchase simply the adapter.

The invention claimed is:

1. A conversion system for converting a hose reel for use as a cord reel comprising:
   a hose reel having a frame including a pair of opposing side panels wherein the frame holds a rotating spool therebetween;
   a hose attachment module including a threaded portion wherein the hose attachment module is attached to one of the side panels of the hose reel;
   an adaptor attached to the one of the side panels of the hose reel, wherein the adaptor includes an outlet electrical cord and a linking electrical cord;
   a threaded connection portion attached at a first end to the adaptor and attached at a second end opposite the first end to the hose attachment module, wherein the threaded connection portion matingly engages the threaded portion of the hose attachment module; and wherein the linking electrical cord extends from the threaded connection portion through the hose attachment module and is trained through an opening in the rotating spool.

2. The system according to claim 1, wherein the linking electrical cord includes a plug portion that is attached to a free end of the linking cord.

3. The system according to claim 1, wherein the outlet electrical cord is plugged into a standard three-prong electrical outlet to provide electricity to the linking electrical cord.

4. The system according to claim 1, wherein the connection portion is threaded into the hose attachment module forms a waterproof connection.

5. The system according to claim 1, wherein the adaptor further comprises:
   a waterproof electrical box including a blank cover; and
   a rotating contact, wherein the linking cord enters the box through the connection portion and terminates in the rotating contact.

6. The system according to claim 5, wherein the rotating contact further comprises a CPVC pipe, a coupling, a PVC electrical male adaptor, a PVC electrical male adaptor, and a rigid conduit electrical reducer bushing.

7. The system according to claim 5, wherein the blank cover secures the rotating contact in place with a CPVC pipe cap.

8. The system according to claim 5, wherein the outlet electrical cord terminates in the electrical box of the adaptor with a stationary contact assembly.

9. The system according to claim 8, wherein the outlet electrical cord includes a set of wires that are connected to the stationary contact assembly with a machine screw.

10. The system according to claim 9, wherein a set of electrical contacts are connected to the stationary contact assembly and the contacts engage the rotating contact to supply power to the linking cord while allowing rotation of the linking cord around the spool of the hose reel.

11. An apparatus for converting a hose reel having a frame with a pair of opposing side panels holding a rotating spool therebetween for use as a cord reel comprising:

a hose attachment module attached to one of the side panels of the hose reel;
   an adaptor attached to the one of the side panels of the hose reel, wherein the adaptor includes an outlet electrical cord and a linking electrical cord;
   a connection portion attached at a first end to the adaptor and attached at a second end opposite the first end to the hose attachment module, wherein the connection portion forms a waterproof connection with the hose attachment module; and
   wherein the linking electrical cord extends from the connection portion through the hose attachment module and is trained through an opening in the rotating spool.

12. The apparatus according to claim 11, wherein the adaptor further comprises:
   a waterproof electrical box including a blank cover; and
   a rotating contact, wherein the linking cord enters the box through the connection portion and terminates in the rotating contact.

13. The apparatus according to claim 12, wherein the rotating contact further comprises a CPVC pipe, a coupling, a PVC electrical male adaptor, a PVC electrical male adaptor, and a rigid conduit electrical reducer bushing.

14. The apparatus according to claim 12, wherein the blank cover secures the rotating contact in place with a CPVC pipe cap.

15. The apparatus according to claim 12, wherein the outlet electrical cord terminates in the electrical box of the adaptor with a stationary contact assembly.

16. The apparatus according to claim 15, wherein the outlet electrical cord includes a set of wires that are connected to the stationary contact assembly with a machine screw.

17. The apparatus according to claim 16, wherein a set of electrical contacts are connected to the stationary contact assembly and the contacts engage the rotating contact to supply power to the linking cord while allowing rotation of the linking cord around the spool of the hose reel.

* * * * *